United States Patent [19]
Gaertner

[11] 4,113,347
[45] Sep. 12, 1978

[54] ARRANGEMENT FOR DIRECTIONAL RADIATION OF LIGHT IN SYMBOL-INDICATOR SYSTEMS

[75] Inventor: Waldemar Gaertner, Wenden, Germany

[73] Assignee: Siemens Aktiengesellschaft, Berlin & Munich, Germany

[21] Appl. No.: 782,187

[22] Filed: Mar. 28, 1977

[30] Foreign Application Priority Data

Apr. 13, 1976 [DE] Fed. Rep. of Germany ....... 2616298

[51] Int. Cl.$^2$ .............................................. G02B 5/16
[52] U.S. Cl. ................................. 350/96.24; 40/452; 350/96.18; 350/213; 40/547
[58] Field of Search ............... 350/96.24, 96.18, 167, 350/213, 127, 128, 129; 40/130 R

[56] References Cited
U.S. PATENT DOCUMENTS

| | | | |
|---|---|---|---|
| 3,649,098 | 3/1972 | Suverison | 350/96.18 |
| 3,853,395 | 12/1974 | Vevick | 350/167 |

*Primary Examiner*—John K. Corbin
*Assistant Examiner*—Stewart Levy
*Attorney, Agent, or Firm*—Hill, Gross, Simpson, Van Santen, Steadman, Chiara & Simpson

[57] ABSTRACT

An arrangement for directional radiation of light in symbol-indicator systems which are to be effective over fairly large distances, with the symbols being formed by dots of a dot matrix which receive light from respective light conductor bundles, particularly for utilization as additional indicators in the railroad signalling field, in which each matrix dot is provided with a lens arrangement comprising two horizontally adjacent lenses having their plane surfaces facing the illuminating light conductors with the two lenses being cooperatively disposed to reproduce two horizontally adjacent partially superimposed light sources in the plane of observation. In the preferred embodiment, the lens structures are of plano-convex configuration, the convex surfaces of which intersect with the spacing between the respective lens axis corresponding approximately to half the lens diameter, and with each lens arrangement being integrally formed with the indicator board or individually formed and adapted to be mounted in respective recesses in a separate indicator board.

9 Claims, 4 Drawing Figures

ARRANGEMENT FOR DIRECTIONAL RADIATION OF LIGHT IN SYMBOL-INDICATOR SYSTEMS

BACKGROUND OF THE INVENTION

The invention relates to an arrangement for the directional transmission of light in symbol indicator systems which are to be visibly effective over comparatively great distances and in which the symbols are formed by dots, of a dot matrix, which form the end termination of respective light conductors of a light conductor bundle, in which the opposite ends of such light conductors may be illuminated by light sources, particularly for use as supplemental or additional indicators in the railroad signalling field.

In such railroad signalling field, so-called additional or supplemental indicators are utilized, over and above the common optical light signals, whereby the desired signal representation is achieved by means of different light colors or different light-dot combinations. It is possible by means of such supplemental indicators to represent desired specific alphanumeric symbols which can be recognized from a train even over relatively great distances. Each supplemental indicator comprises a number of light dots which are distributed over an indicator board of the supplemental indicator, in a matrix configuration, i.e. a predetermined pattern or grid with the various light dots being illuminated in dependence upon the symbol to be depicted. Suitable signal lamps, for example, may serve as the light source for the illumination.

It is already known in the art, for example from German Auslegungsschrift No. 2,437,580, to effect the desired illumination of the matrix dots by means of respective ends of multi-light-conductor bundles whose grouped opposite ends may be illuminated by suitable light sources. In order to improve the symbol visibility over fairly great distances, particularly under poor visibility conditions, it is known in the art to associate specific optical systems with the individual matrix dots, whereby the optical systems are provided with a frustrum shape, intended to radiate as large a portion as possible of the light, received from the light conductors, in the direction toward a distant observer.

While this known type of signal indicator system possesses the advantage of relatively good recognizability, even over fairly large distances, it is subject to the drawback that the individual light dots by which the symbols are depicted, can be recognized only within a very specific narrow lateral angle, corresponding to the particular angle of the optical system disposed in front of the light conductors. Even relatively minor lateral positional deviations of an observer from the optical axes of the projecting system, produces an extremely strong impairment, at the location of observation, of the recognizability of the symbol which is sought to be depicted. Such axial shifts between observer and optical projection system may result, for example, from the track configuration ahead of the indicator involved, as well as from the incorrect locating or directional orientation of such indicators.

BRIEF SUMMARY OF THE INVENTION

It is therefore the object of the present invention to provide an arrangement in a symbol-indicator system, of the type referred to, in which the directional radiation pattern of light emitted will laterally span a relatively wide angle of the horizontal direction without materially impairing the brightness of the light radiated in the main axial direction of the optical system.

This objective is achieved, in accordance with the invention, by utilizing a lens arrangement, for each dot of the matrix, which comprises two horizontally adjacent, preferably plano-convex lenses whose plane surfaces face the adjacent ends of the associated light conductors, and which are so relatively disposed that two horizontally adjacent, partially superimposed light sources are reproduced in the observation plane.

BRIEF DESCRIPTION OF THE DRAWINGS

In the drawings wherein like reference characters indicate like or corresponding parts.

DETAILED DESCRIPTION OF THE INVENTION

Figure 1:
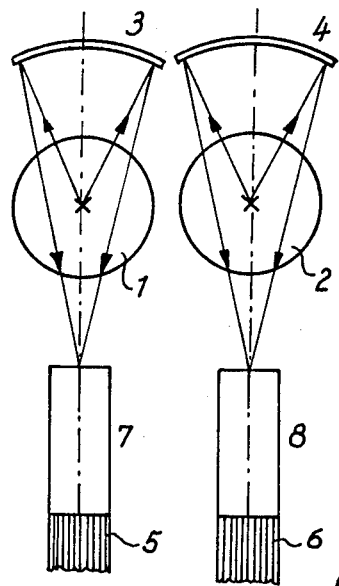
FIG. 1 schematically illustrates a supplemental indicator embodying the invention.

Referring to FIG. 1, reference numerals 1 and 2 designate respective light sources, which may be provided with corresponding reflectors 3 and 4, for the illumination of respective bundles 5 and 6 of individual light conductors, with the adjacent light receiving ends of each bundle being retained in assembled relation by a suitable corresponding retaining sleeves such as the sleeves 7 and 8. The individual light conductors may be provided with similar sleeves at their light discharge ends, which may be received in suitable bushings or ferrels at the rear of the indicator board 9 of the additional or supplemental indicator.

The respective individual light conductors are operative to conduct light to the associated lens arrangement 10, each of which represents a matrix dot with the illumination of selected dots being operative to produce the desired symbol.

Figure 2:
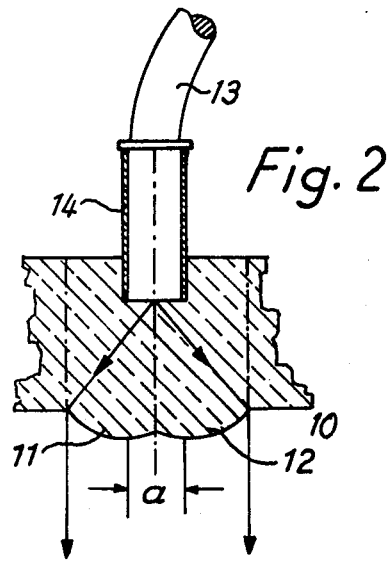
FIG. 2 is a horizontal sectional view of a lens arrangement in accordance with the invention.
Figure 4:
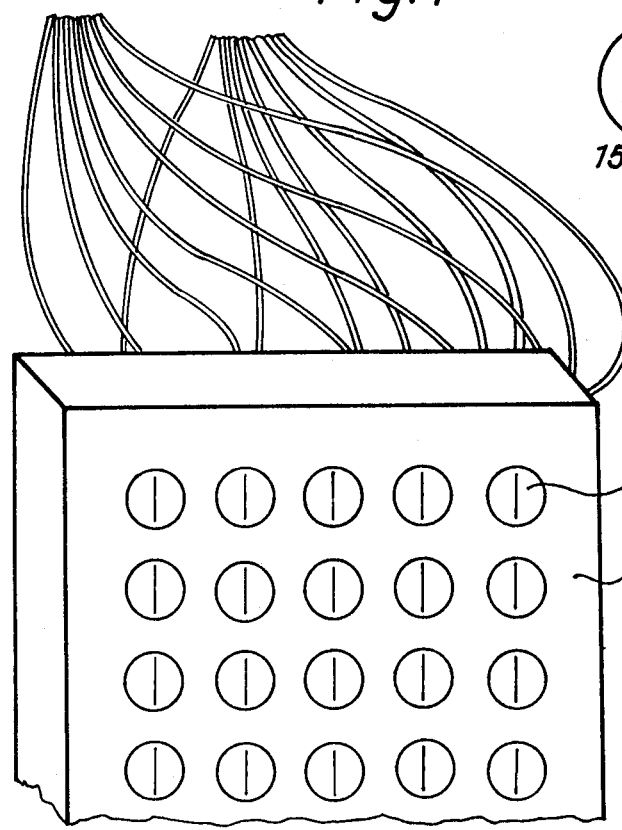
FIG. 4 is a sectional view similar to FIG. 2, illustrating a lens arrangement of modified construction.

As illustrated in FIG. 2 the respective lens arrangements can be constructed as an integral part of the indicator board or, as hereinafter described in connection with FIG. 4, may be in the form of individual components which may be mounted in cooperable recesses in the indicator board. In either case, each lens arrangement comprises two lenses 11 and 12, preferably of plano-convex configuration, in which their curved surfaces intersect, with the axes of the lenses being horizontally spaced, preferably a distance approximately half of the individual lens diameter, i.e. somewhat less than one-half the lens diameter in the embodiment of the invention illustrated, whereas the area which may be considered as being a superimposition of the two lenses has a horizontal width a. As will be apparent from FIG. 2, the common plane surface of the two lenses face the associated light conductor 13, which is illustrated as having its adjacent end terminating in a sleeve 14, with the free end of the latter and the light conductor being suitably mounted in a corresponding recess of the lens arrangement and suitably secured therein, for example, by means of a press fit or gluing.

Figure 3:
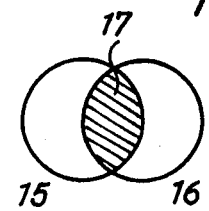
FIG. 3 represents a reproduction of the light source projected in the observation plane by the lens arrangement illustrated in FIG. 2.

As illustrated in FIG. 3, the two lenses 11 and 12 of the lens arrangement are adapted to reproduce two horizontally adjacent partially superimposed light sources 15 and 16 in the observation plane. As a result of the overlapping area 17 of the two light sources 15 and 16 such area has an illumination of approximately twice that of the illumination provided by the individual portions of the two lenses, to produce a relatively very great brightness in the direction of the main optical axis of the lens arrangement, which decreases in lateral direction to an exact specific value which is still adequate for achieving recognizability of the illuminated symbol.

In the embodiment illustrated in FIG. 2, the lens arrangements for the respective matrix dots, as previously mentioned, are integrally formed with the indicator board structure, i.e. the board may be of a material suitable to enable fabrication of the lens arrangements therefrom, and obviously in such case the intermediate portions of the board between the individual matrix dots may be rendered opaque by the application of a suitable opaque material to such intermediate portions, or by the utilization of a separate opaque sheet which is provided with suitable apertures or the like for each matrix dot.

However, it is also possible to fabricate the lens arrangement as individually formed components which can be mounted in corresponding recesses of the indicator board, which, in such case, can be fabricated from a suitable opaque material. Such a construction is illustrated in FIG. 4, in which the board 9 is constructed of opaque material and the lens arrangement 10 is an individual component inserted in a cooperable bore in the board 9. In such case, the lens arrangement 10, as illustrated, may comprise the portion of the arrangement of FIG. 2 extending between the broken lines extending in alignment with the parallel directional arrows. It is also possible to provide the individually formed lens arrangements with a conical configuration, functioning as a reflector for the beams emitted from the light conductor 13.

Likewise, as previously mentioned, it is particularly advantageous if the horizontal distance between the respective optical axes of the lenses of each lens arrangement corresponds approximately to half the lens diameter, as a relatively large angle of incident light is then provided without undue enlargement of the individual lens arrangement.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. In an arrangement for the directional radiation of light, in symbol-indicator systems which are to be effective over comparatively great distances, with the symbols being formed by dots of a dot matrix, at which the ends of respective light-conductor-bundles terminate, and the opposite conductor ends of which may be illuminated by light sources, particularly for utilization as supplemental indicators in the railroad signalling field, the combination of a lens arrangement for each matrix dot, each of which comprises two horizontally adjacent lenses, each of which has a plane surface and a curved surface, with their plane surfaces facing the associated light conductor, and with the lenses of such lens arrangement being cooperably disposed to reproduce two horizontally adjacent partially superimposed light sources in the plane of observation.

2. An arrangement according to claim 1, wherein said lenses are each of plano-convex configuration, the convex surfaces of which intersect, with the horizontal spacing between the lens axes of each lens arrangement corresponding to approximately half the lens diameter.

3. An arrangement according to claim 1, wherein each lens arrangement comprises an individually formed part which can be mounted in a corresponding recess of an indicator board of the indicator system.

4. An arrangement according to claim 2, wherein each lens arrangement comprises an individually formed part which can be mounted in a corresponding recess of an indicator board of the indicator system.

5. An arrangement according to claim 1, wherein the lens arrangement for each raster dot is formed as an integral component of an indicator board of the indicator system.

6. An arrangement according to claim 2, wherein the lens arrangement for each raster dot is formed as an integral component of an indicator board of the indicator system.

7. An arrangement according to claim 1, wherein each lens arrangement is provided, at the light receiving side thereof, with a recess for the associated cooperable light conductor.

8. An arrangment according to claim 4, wherein each lens arrangement is provided, at the light receiving side thereof, with a recess for the associated cooperable light conductor.

9. An arrangement according to claim 6, wherein each lens arrangement is provided, at the light receiving side thereof, with a recess for the associated cooperable light conductor.

* * * * *